(12) United States Patent  
Kohler

(10) Patent No.: US 9,069,169 B1
(45) Date of Patent: Jun. 30, 2015

(54) PRETENSIONED BACKPLANE FOR TENSIONED MEMBRANE

(71) Applicant: Randall E. Kohler, Cary, IL (US)

(72) Inventor: Randall E. Kohler, Cary, IL (US)

(*) Notice: Subject to any disclaimer, the term of this patent is extended or adjusted under 35 U.S.C. 154(b) by 0 days.

(21) Appl. No.: 14/277,331

(22) Filed: May 14, 2014

(51) Int. Cl.
| G02B 7/182 | (2006.01) |
| G02B 7/188 | (2006.01) |
| F24J 2/12 | (2006.01) |
| F24J 2/10 | (2006.01) |
| G02B 26/08 | (2006.01) |
| F24J 2/52 | (2006.01) |

(52) U.S. Cl.
CPC ..... *G02B 26/0825* (2013.01); *F24J 2002/5286* (2013.01)

(58) Field of Classification Search
CPC ................................. F24J 2002/5286
See application file for complete search history.

(56) References Cited

U.S. PATENT DOCUMENTS

| 7,748,376 B2 * | 7/2010 | Bender .................. 126/696 |
| 2013/0000692 A1 * | 1/2013 | Switkes .................. 136/246 |

* cited by examiner

*Primary Examiner* — Jade R Chwasz

(57) ABSTRACT

The invention is an improved reflective element used with a heliostat or any application where a reflective surface is required to provide low cost, low weight, and will maintain a relatively high degree of planar integrity under changing environmental conditions. The invention is based on a pretensioned backplane with aligned peripheral edges to produce a planar surface that a membrane material can be extended across and the membrane is securely attached at the bottom of the peripheral edges. This configuration provides a constant tension to the membrane which prevents the membrane from deforming as thermal cycling occurs. The pretension placed on the backplane produces an arching effect that is captured when the membrane is securely attached and remains arched once the backplane is released from the tensioning form. The arching of the backplane provides added strength and rigidity sufficient to minimize the need for additional structural components.

2 Claims, 7 Drawing Sheets

PRETENSIONED BACKPLANE FOR TENSIONED MEMBRANE

BACKGROUND OF INVENTION

I. Field of the Invention.

The present invention relates to solar reflectors based on a tensioned polymeric reflective membrane and the invention relates specifically to the backplane and supporting periphery structure that tensions the membrane. It also pertains to the category of flat reflectors used as a part of a heliostat for directing and/or concentrating electromagnetic energy.

II. Background of the Related Art.

The purpose of solar reflectors are to direct electromagnetic/solar energy to a specified target where it can be used as radiant heat, light, or converted to another form of energy. By aiming multiple flat mirrored reflectors at a single target, a concentration of the solar energy occurs. Concentrating solar energy is advantageous because it provides greater temperatures that can be better utilized for a large variety of applications.

A heliostat is made up of one or more reflector element(s) and a mechanized solar tracking device that is used to maintain the proper positioning of the reflector(s) to bisect the angle of the Sun so the solar energy is directed to a static target or receiver as the sun crosses the sky.

Directly exposing and concentrating solar energy to a target is the most efficient form of solar energy capture. Tracking technologies such as microprocessors, GPS modules, XYZ axis sensing and positioning modules and stepper motors that are used to drive heliostats have become very cost effective, but the relative complexity and costs of the heliostat and receiving target devices have remained high. The time for a return on investment on heliostat arrays can easily be greater than 20 years and in some cases never break even because of maintenance costs. Due to the cost disadvantages, it is difficult for the solar industry to compete on price per kilowatt delivered as compared to other competing energy sources.

A primary reason a heliostat is expensive is the reflective optics must maintain their designed contour while withstanding extreme environmental conditions. Flat reflective elements are typically made of mirrored glass lamented to a structurally rigid core and attached to a heavy metal frame. All of the mechanical specifications of the heliostat have to be designed to reliably support and accurately position the heavy reflector element and at the same time withstand rain, wind, hail, dust and heat. The most significant contributing factors to the cost are the type of materials used, weight and complexity of the reflector element which increases the overall cost of the reflector element. These factors contribute to increased cost of the drive and pivot mechanisms to support the weight and provide reliable operation under extreme environmental conditions.

Jonathan Switkes (U.S. Pat. 2013/0000692 Jan. 3, 2013) laminates a rear plate, an intermediate mesh and a front reflective glass element to reduce thermal stress and improve planar flatness and structural rigidity. This is then mounted to a metal frame that provides the interface to the heliostat drive mechanism.

Using glass mirrored based heliostats presents other problems if heliostats are ever to become practical for residential and light commercial use. The problems are the liability of safety due to possible glass breakage and the expense of replacement.

Attempts to improve safety, reduce weight and cost by using polymeric membranes with reflective coating have been somewhat successful. They are used in solar trough concentrators, inflatable dish style reflectors, and sealed drum shaped collectors where a vacuum is placed inside the seal drum to produce a concave shape on the membrane to produce a concentrating dish style reflector. In most cases the weight and cost was not significantly reduced due to adding other infrastructure into the design to compensate for the severe bending and twisting forces on the frame due to the stretching of the membrane across the frame.

Mark Earle Hutchinson (U.S. Pat. No. 3,733,116 May 15, 1973) introduces a wedging technique to offset the bending and twisting of the frame when the membrane is stretched across the frame.

Eugene Martinez (U.S. Pat. No. 3,877,139 Apr. 15, 1975) created a glassless mirror using a metalized polyester mirror film attached to a formed metal pan.

Charles Kojabashian (U.S. Pat. No. 3,880,500 Apr. 29, 1975) describes a planar mirror improvement by stretching reflective metalized film membrane on both sides of a frame to equalize the forces that would warp and distort the frame if the film were placed only on one side of the frame.

The mentioned art forms address compensating for the undesirable forces created when stretching a membrane across a frame but do not address maintaining a constant tension over changing thermal conditions. Specifically attaching membranes to a supporting structure present a big problem that needs to be compensated for when exposed to changing thermal conditions. The problem is due to different expansion coefficients of the membrane relative to the different materials used in the supporting structure. In many cases it is very difficult to maintain an optically flat reflective membrane surface even with a small temperature change of only a 10 degrees centigrade. The result is a rippling effect of the membrane which grossly distorts and diffuses the reflected solar energy. The problem increases as the size of the reflective element increases. One solution includes adding a heating element around the perimeter to maintain a constant temperature for the supporting structure.

Douglas Evan Simmers (U.S. Pat. No. 2008/0137271 A1 Jun. 12, 2008) implements a circumferential heating element in a drum shaped frame to compensate for differences in thermal coefficients of the membrane and frame components.

Other applications do not attempt to maintaining an optically flat membrane because of the rippling caused by thermal change. Instead they exert a positive or negative atmospheric pressure in various configurations that creates a concave shape for concentrating the solar energy to a focal point.

Patrick Soliday (U.S. Pat. No. 5,680,262 Oct. 21, 1997) utilized a heavy frame and with multiple pneumatic cylinders to maintain tension in a stretched planar membrane as it is attached and sealed to both sides of a circular frame to form a sealed drum. A negative atmospheric pressure (a vacuum) is applied to the inside of the drum imparting a parabolic shape to both membranes. The additional negative pressure provides some compensation for thermal changes due to the constant tension on the membrane provided by the vacuum.

Safety issues also exist for concave or dished reflectors that densely concentrate the solar energy to a focal point. These present a potential fire and/or health hazard if the focal point would go astray and land on a material with a low combustible temperature or create burns on human skin. These would not be practical for residential space heating and lighting.

Each of the previously mentioned teaching do not address or provide the ability to easily replace a defective or damaged membrane. The cost of on going maintenance on such devices can easily offset any monetary gains from solar energy capture.

BRIEF SUMMARY OF THE INVENTION

The invention is an improved reflective element used with a heliostat or any application where a tensioned surface is required to provide high safety, low cost, low weight, ease of maintenance with minimal complexity and will maintain a relatively high degree of optical or planar integrity under changing environmental conditions.

The embodiment of the invention is a pretensioned backplane with aligned peripheral edges to produce a flat plane surface that a membrane material can be extended across and the membrane would be securely attached all along the bottom region of the formed peripheral edge. This configuration provides a relatively constant and even tension to the planar membrane which prevents the membrane from deforming as thermal cycling occurs. The pretension placed on the backplane produces an arching effect that is captured when the membrane is securely attached and remains arched once the backplane is released from the tensioning form. The arching of the backplane provides added strength and rigidity sufficient to minimize the need for additional structural components.

The embodiment of the invention provides improvements in the areas specific to weight, cost, safety, maintenance and ultimately a quicker return on investment making renewable solar energy more viable for more applications. The invention uses relatively low cost, light weight materials, with the ability to easily replace damaged or defective components.

DETAILED DESCRIPTION OF THE INVENTION

The Figures (FIG.) and the following description relate to preferred embodiments of the present invention by way of illustration only. It should be noted that from the following discussion, alternative embodiments of the structures and methods disclosed herein will be readily recognized as viable alternatives that may be employed without departing from the principle of the claimed invention.

As shown in the Figures the embodiment is an improved reflective element of a heliostat or any other application where a planar membrane surface is required. For the best illustration of the invention and function of its components, standard "off the shelf" components and materials were utilized with simple modifications.

Definition of the term "pretensioned" for this teaching generally relates to an object that has been prestressed and has potential energy stored in it.

The first series of Figures describe the elements of the backplane assembly, the attributes and the function of each component of the backplane assembly and placement as part of the assembly process. The second set of Figures is specific to the backplane assembly pretensioning process and the completed pretensioned backplane with tensioned membrane attached.

Figure 1A:
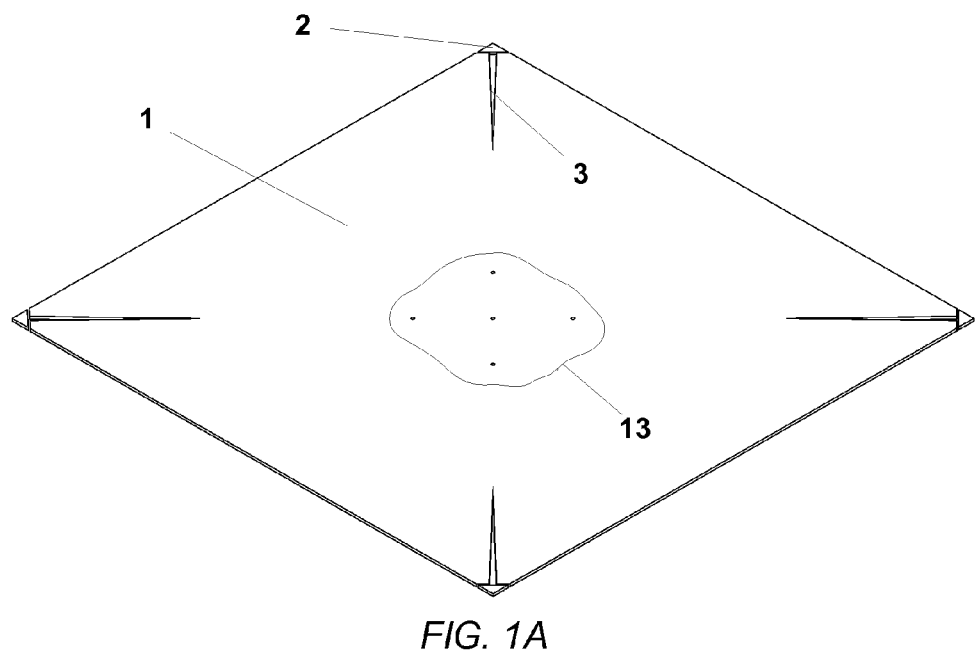
FIG. 1A is an isometric view of the backplane (1) and the corner alignment devices (2) that illustrates the positioning and relationship of the said components.

The backplane (1) component as shown in FIG. 1A is a key component of the embodiment that provides the constant tension to the membrane and is the primary mounting and support structure of the reflector element. The backplane (1) as illustrated in FIG. 1A is a four sided sheet of material that has each corner modified to provide corner alignment devices (2) and corner relief cuts (3) at each corner. The backplane (1) is not limited to four sides, it would be practical to have a backplane with three or more sides. In each instance, each corner would be formed to provide corner alignment devices (2) and relief cuts (3) to accommodate the tensioning process. The sheet material used for the backplane (1) can vary in size and shape and it would require structural characteristics that would make it flexible but also have the ability to maintain the stored potential energy imparted when tensioning the backplane (1), without potential energy loss and will not warp with age. The backplane material should be resilient, lightweight, and corrosion resistant.

Due to the flexibility of the backplane (1) material and the corner relief cuts (3), the backplane (1) corners may deviate from a planar alignment. The function of the corner alignment device (2) in FIG. 1A is to provide a common alignment point at the intersection of each corner of the backplane (1). The alignment corner devices (2) are held in place by the edge channels (6) and help provide the corner to corner alignment that is critical to achieve a planar edge to edge alignment for the membrane. The corner alignment device (6) can be made of the same material as the backplane (1) or any material that provides the rigidity to maintain proper corner alignment. The corner alignment device may required a slight bend to improve the corner alignment. This is performed as required per specific application. The corner alignment device is not fixed in place, but floats to allow for thermal expansion and contraction of the membrane and the backplane. For some applications a different method of corner alignment maybe more applicable. Maintaining planar edge alignment at each corner is required to maintain a good planar surface for the membrane.

The corner relief cuts (3) in the backplane (1) in FIG. 1A are required as part of the embodiment to accommodate the even bending and tensioning of the backplane (1). The corner relief cuts (3) are a miter style cut that bisects each corner and allow the two edges to come together and meet when the backplane (1) is tensioned. The actual length and angle of the corner relief cut (3) is dependent on a number of varying factors that would be specific to the number of sides, type of backplane material used, size of backplane, and desired degree of tension required.

Figure 1B:
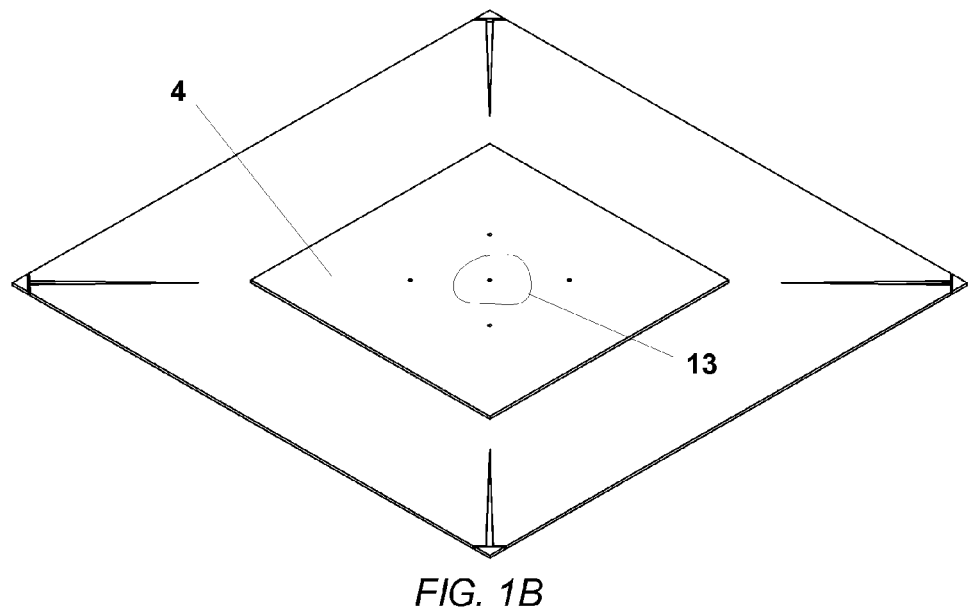
FIG. 1B is an isometric view of the backplane, corner alignment devices and added torsion plate (4) that illustrates the positioning and relationship of the said components.

The first step of assembly in FIG. 1A is to apply a bead of compatible adhesive (13) to the backplane (1) before placement of the torsion plate (4) on the backplane as illustrated in FIG. 1B. The torsion plate (4) is then aligned on the backplane (1), covering the adhesive. The torsion plate (4) FIG. 1B provides additional stiffness to the backplane assembly and is specifically shaped and sized to provide the desired tensioning at the backplane assembly corners and edges when the backplane is pretensioned.

Figure 1C:
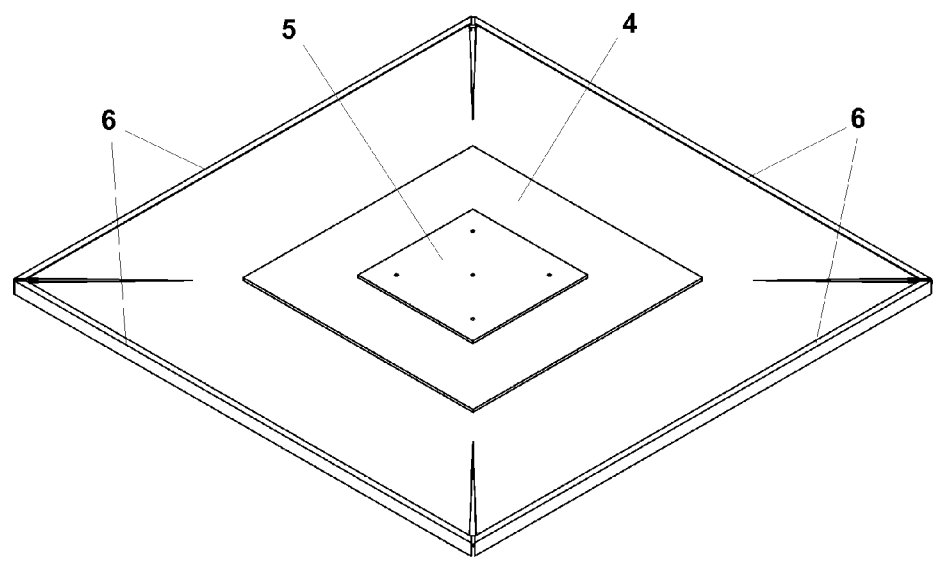
FIG. 1C is an isometric view of the backplane, corner alignment devices, torsion plate, and added mounting plate (5) and edge channels (6) that illustrates the positioning and relationship of the said components.

The next step in assembly is to apply a compatible bead of adhesive (13) to the tension plate (4) in FIG. 1B prior to positioning the mounting plate (5) in FIG. 1C.

Figure 1D:
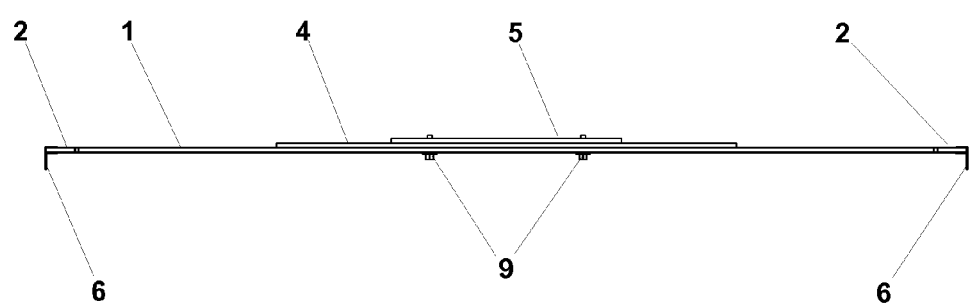
FIG. 1D is a simplified side view of the backplane (1), corner alignment devices (2), torsion plate(4), mounting plate (5), and edge channels (6) that best illustrates the positioning and relationship of the said components.

Mounting plate (5) in FIG. 1C is place on the tension plate (4). The function of the mounting plate (5) is to provide a material of greater density and strength than the backplane (1) and tension plate (4). The mounting plate (5) provides a threaded attachment for mounting fasteners (9) and is used to pull together and align the backplane (1), and tension plate (4) with the mounting plate (5) while the adhesive cures. The result provides a structurally rigid interface on the pretensioned backplane that interfaces with attachments points on the heliostat or other host device. The resulting rigidity provided by the tension plate (4) and mounting plate (5) inhibits any sagging or deflection when directed by a heliostat or during adverse environmental conditions. FIG. 1D illustrates the simplified side view relationship of the assembled backplane (1), tension plate (4), mounting plate (5) and mounting fasteners (9).

Figure 3:
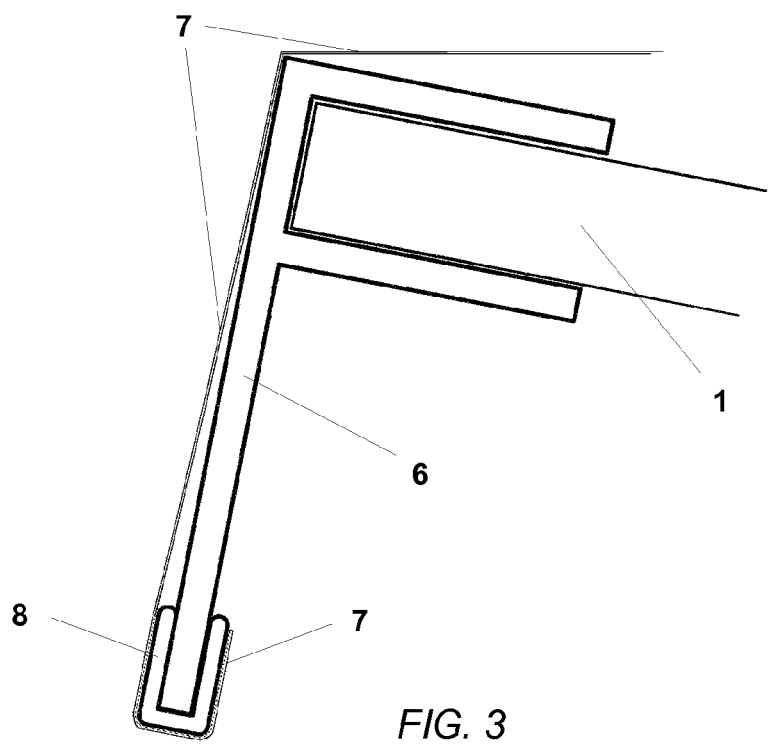
FIG. 3 is an enlarged and simplified view that illustrates the membrane bonded to a "U" channel that is affixed to the backplane assembly edge channel.

The function of the edge channels (6), per FIGS. 1C and 1D, are to maintain a straight line edge on each side of the backplane that delineates the edge of the planar surface that the membrane is tensioned across. This will be referred to as the peripheral planar edge(s) or just planar edge(s). Each end of the edge channels (6) are mitered to an angle that is appropriate based on the angle of the corners of the backplane (1). The edge channels (6) are a snug slide fit over the edge of the backplane's (1) sides, and in this example are not required to be attached to the backplane by adhesive or other physical means. The edge channel (6) material can be plastic, composite, or metal, but must have the required structural properties to provide the rigidity to maintain a straight line for each planar edge on each side of the backplane (1). There maybe other cross sectional shapes of edge channel (6) that would suffice, but the edge channel (6) must have the required properties to provide the structural rigidity to maintain a straight planar edge and provide an attachment point for the membrane (FIG. 3). The next step as part of the assemble process is to mount the edge channels (6) (as in FIGS. 1C and 1D) to the edges to the backplane (1). As the edge channels (6) are mounted, the corner alignment devices (2) must be inserted and captured at each corner by the two adjoining edge channels (6).

At this point of the process a complete backplane assembly has been created and is ready for tensioning and then the attachment of the membrane. The backplane assembly consists of the backplane (1) the corner alignment devices (2), torsion plate (4), mounting plate (5), mounting fasteners (9) and edge channels (6) (per FIGS. 1C and 1D).

All of the functionality of the backplane (1), the torsion plate (4), the mounting plate (5), and edge channel (6) components can be integrates into a single monolithic backplane component if the backplane was formed by a thermal molding process or a molded composite material or a combination of each. The function of a corner alignment device would still be required, but instead of a device captured by the edge channel, a floating alignment device would be used at each corner and alignment holes or channels would be molded or formed into each corner of the integrated backplane that would accept the alignment device for the purpose of planar edge alignment at each corner.

Figure 2A:
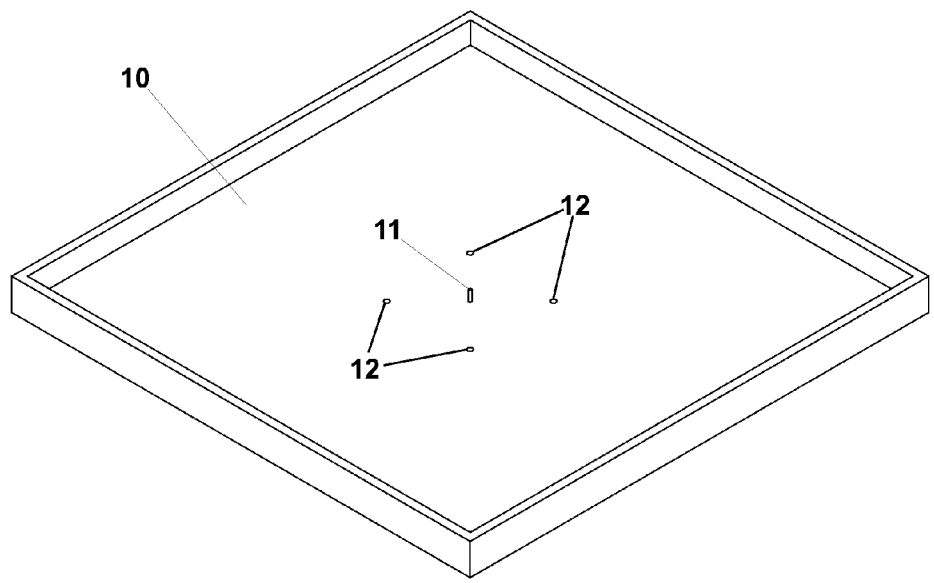
FIG. 2A is a isometric view of the tension form (10) used to pretension the backplane assembly.

FIG. 2A illustrates the tension form (10) that is used to pretension the backplane assembly. The tension form (10) is a shallow form that has the same number of sides as the backplane assembly that would be tensioned. The depth and scale of the tension form (10) determines the degree of tensioning that is imparted to the backplane assembly when tensioned in the tension form (10). The tension form (10) provides a center hole and a fastener (11) that is used to pull the backplane assembly into the tension form (10) and secure the backplane assembly while the membrane is attached. The tension form (10) also provides alignment holes (12) that keep the backplane assembly in proper registration with the tension form (10) when tensioned (FIGS. 2A, 2B and 2C).

For automated manufacturing or for field replacement of the membrane the tension form could be substituted by a different apparatus or fastening devices performing the equivalent function of arching the backplane and drawing the mitered corners together for the purpose of attaching or detaching the membrane.

Figure 2B:
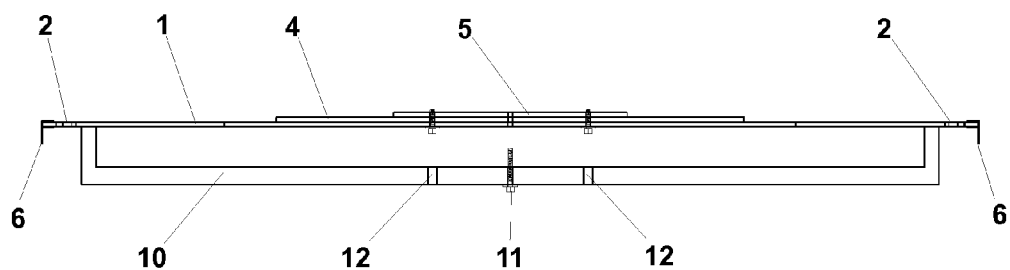
FIG. 2B is a simplified side view that best illustrates the backplane assembly and its position relative to the tension form (10) before the tensioning has occurred.

FIG. 2B is a simplified side view that illustrates the backplane assembly positioned and aligned on the tension form (10) before the tension fastener (11) has been attached and tightened.

Figure 2C:
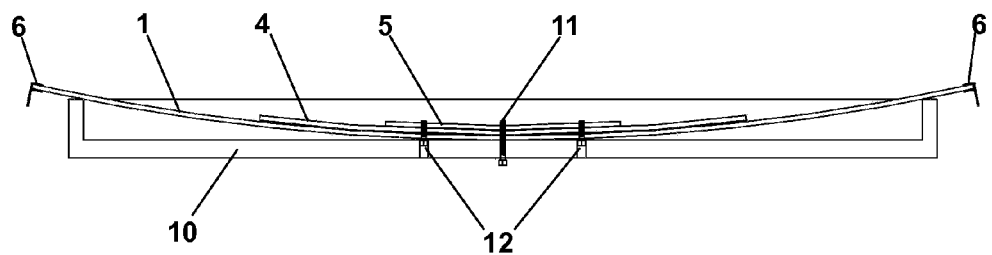
FIG. 2C is a simplified side view that best illustrates the backplane assembly and it's new contour and position relative to the tension form when tension has been applied.
Figure 2D:
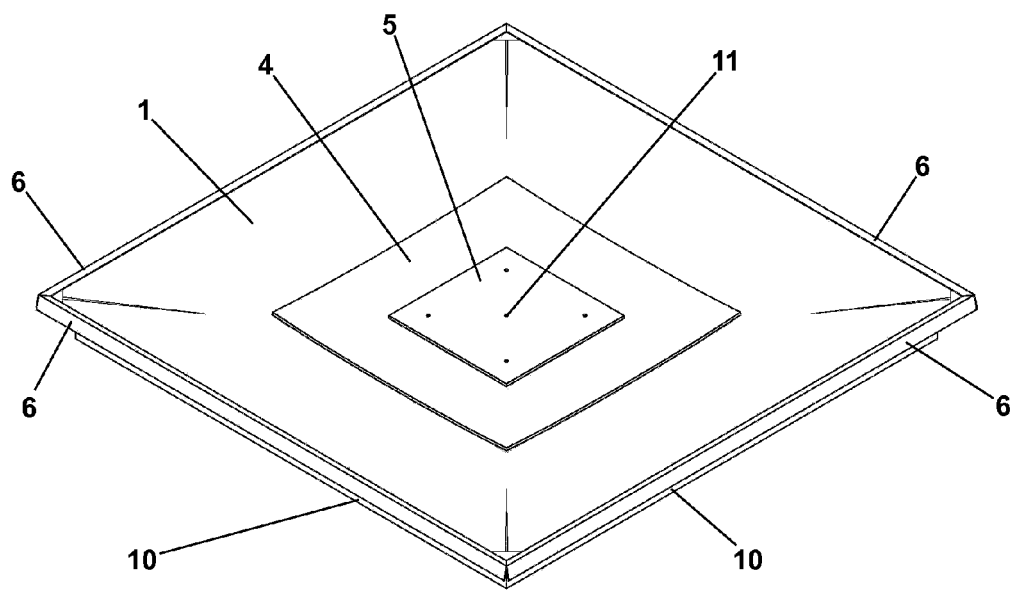
FIG. 2D is an isometric view of the backplane assembly tensioned in the tension form prior to the application of the membrane.

The next step in the assembly process is to attach and tighten the tensioning fastener (11) as illustrated in FIG. 2C. As the backplane assembly is tightened into the tension form (10), kinetic energy is stored in the backplane assembly as potential energy. FIGS. 2C and 2D illustrates the backplane assembly becoming dish shaped, the mitered corner relief cuts (3) and edge channel (6) mitered ends drawn together as the backplane assembly is pulled into the tension form (10).

Figure 2E:
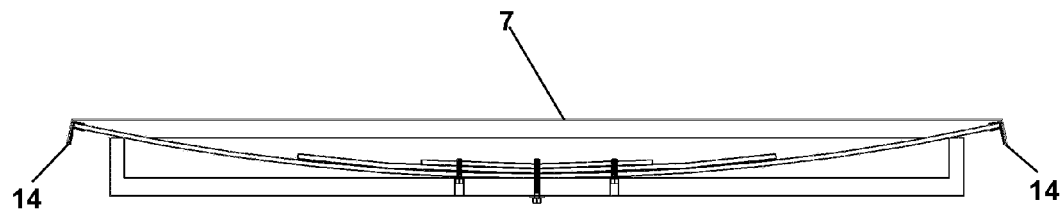
FIG. 2E is a simplified side view that best illustrates the backplane assembly tensioned in the tension form and the applied membrane (7).
Figure 2F:
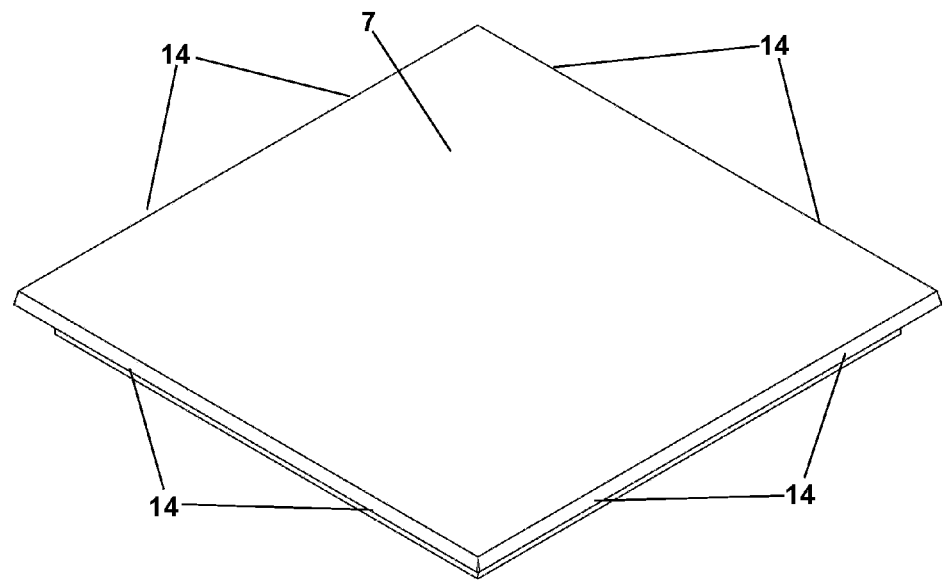
FIG. 2F is an isometric view of the backplane assembly tensioned in the tension form after the application of the membrane (7).
Figure 2G:
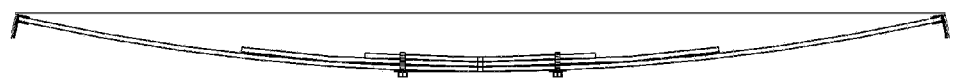
FIG. 2G is a simplified side view that best illustrates the backplane assembly with attached membrane retaining it's tension after removal from the tension form.

Next the membrane (7) is tensioned evenly over the top planar edges of backplane assembly forming a planar surface. The membrane (7) extends over the planar edge of the edge channel (6) on each side and is attached at the bottom edge (14) of the "F" on the edge channel on all sides as illustrated in FIGS. 2E and 2F. The membrane can be attached to the edge channels with tape, thermally activated tape or adhesive. A preferred means of attaching the membrane, as illustrated in FIG. 3, would be to first bond the membrane to a compatible plastic "U" edge channel that would attach on the bottom edge of the "F" channel. This would provide easy replacement of the membrane component "in the field".

Removing the tension fastener (11) releases the backplane assembly from the tension form (10) and the result is pretensioned backplane which imparts it's stored potential energy as a constant force that presses outward on all planar edges of the membrane. The constant pressure is instrumental in providing an optically flat reflective surface and it reduces the effects of thermal changes that can cause rippling and distortion of the membrane. Additionally the pretensioning of the backplane (1) produces an arching effect that imparts greater strength and rigidity into the structure as a whole which reduces the need for any added stiffeners or supports.

Figure 4:
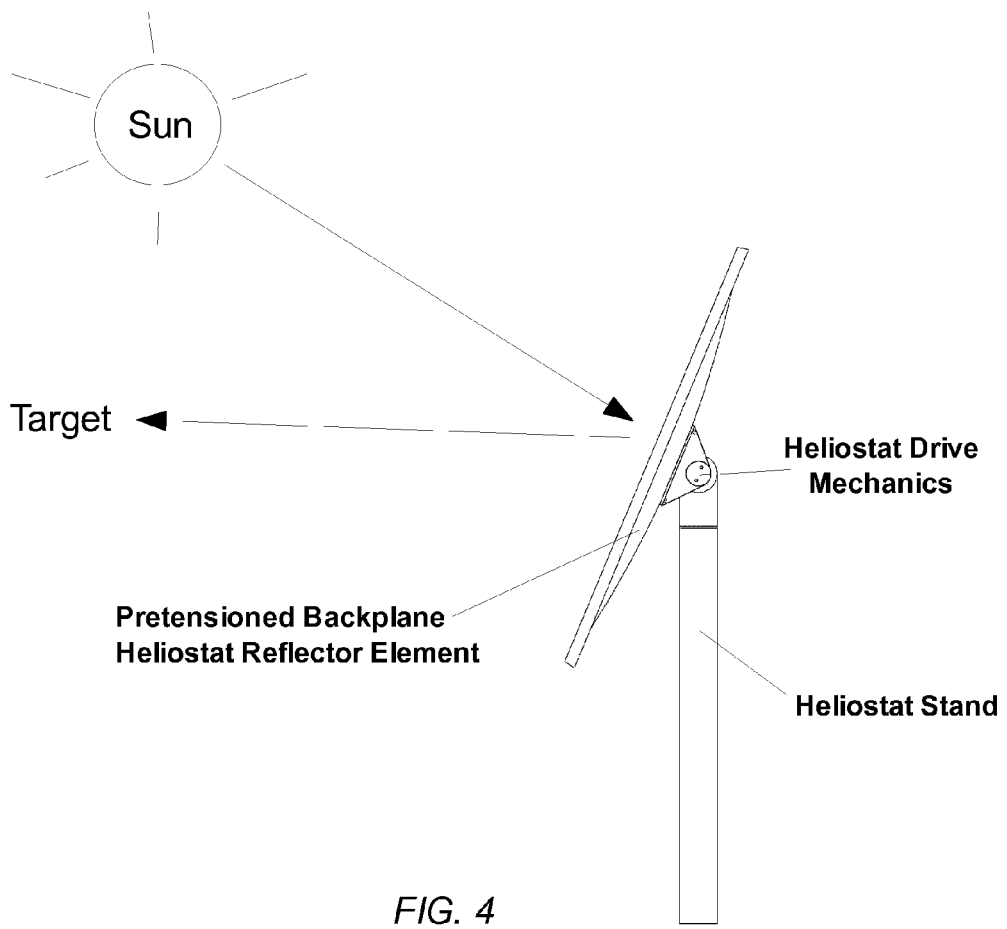
FIG. 4 illustrates the completed pretensioned backplane assembly interfaced to the drive mechanics of a heliostat.

The appropriate mounting brackets can then be added to provide a mounting interface to a host device such as a heliostat as illustrated in FIG. 4.

The foregoing description of the preferred embodiment of the invention has been presented for the purpose of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed:

1. An improved design for providing tension to a membrane that reflects, radiates or is a receiver of electromagnetic energy, comprising
    a pretensioned backplane with 3 or more planar edges that form the primary supporting structure and provide tension to the attached membrane,
    a periphery stiffening edge channel to maintain planar alignment along each planar edge that define the membrane plane,
    a corner alignment device at each corner to maintain alignment of the planar edges at each corner,
    a torsion plate or plurality of torsion plates shaped to provide additional stiffness and even tensioning on each planar edge,
    a mounting plate to provide a structural mounting interface to a host device,
    a means to secure backplane, torsion plate, and mounting plate together to form a rigid supporting structure that interfaces to a host device,
    a means to miter, shape or form each corner of the backplane to provide clearance when the backplane is pretensioned,
    a means to pretension the backplane assembly for the purpose of attaching or detaching the membrane or a plurality of membranes,
    a means to pretension the backplane assembly to store potential energy that is used to maintain tension on the attached membrane or a plurality of membranes,
    a nonporous reflective, transmissive, translucent or opaque membrane or a plurality of membranes attached to the pretensioned backplane,
    a means to attach the said membrane or a plurality of membranes at the periphery to the associated edge channels.

2. The pretensioned backplane of claim 1, where the backplane, torsion plate, mounting plate, and edge channel are unified to produce a monolithic backplane component that integrates the functionality and purpose of each said discrete component.

* * * * *